United States Patent [19]

Hussmann

[11] 4,342,569
[45] Aug. 3, 1982

[54] METHOD AND APPARATUS FOR ABSTRACTING WATER FROM AIR

[75] Inventor: Peter Hussmann, Munich, Fed. Rep. of Germany

[73] Assignee: Mittex AG, Vaduz, Liechtenstein

[21] Appl. No.: 184,181

[22] Filed: Sep. 4, 1980

[30] Foreign Application Priority Data

Sep. 4, 1979 [DE] Fed. Rep. of Germany ....... 2935697

[51] Int. Cl.³ ............................................ B01D 53/04
[52] U.S. Cl. ......................................... 55/33; 55/35; 55/74; 55/208; 55/387
[58] Field of Search .................. 55/31, 33, 35, 74, 75, 55/179, 180, 208, 387, 389; 165/80 B, DIG. 4

[56] References Cited

U.S. PATENT DOCUMENTS

| | | | |
|---|---|---|---|
| 2,138,689 | 11/1938 | Altenkirch | 55/33 X |
| 2,790,505 | 4/1957 | Dow | 55/33 |
| 3,230,689 | 1/1966 | Hussmann | 55/31 X |
| 3,263,400 | 7/1963 | Hoke et al. | 55/33 |
| 3,400,515 | 9/1968 | Ackerman | 55/33 X |
| 3,421,578 | 12/1966 | Marton | 165/80 B |
| 4,081,024 | 3/1978 | Rush et al. | 165/DIG. 4 |
| 4,146,372 | 3/1979 | Groth et al. | 55/33 |
| 4,185,969 | 1/1980 | Bulang | 55/33 X |
| 4,219,341 | 8/1980 | Hussmann | 55/179 |

FOREIGN PATENT DOCUMENTS

| | | |
|---|---|---|
| 2702701 | 7/1978 | Fed. Rep. of Germany .......... 55/33 |
| 2810241 | 9/1979 | Fed. Rep. of Germany .......... 55/33 |

Primary Examiner—Robert H. Spitzer
Attorney, Agent, or Firm—Schwartz, Jeffery, Schwaab, Mack, Blumenthal & Koch

[57] ABSTRACT

Method and apparatus for abstracting water from air wherein in a first phase of a recurring cycle a stream of cool, moist air from the atmosphere first cools a first heat storage condenser (1) and then humidifies a hygroscopic medium (14); in a second phase a stream of warm air additionally heated by solar radiation expels moisture from the hygroscopic medium and carries the moisture into said first heat storage condenser (1) where it condenses, releasing condensation heat, and drains away; in a third phase another stream of cool, moist air from the atmosphere first cools a second heat storage condenser (2) and then rehumidifies the hygroscopic medium, and in a fourth phase another stream of warm air heated by solar energy again expels the moisture from the hygroscopic medium and carries the moisture to said second heat storage condenser where it condenses and drains away, and wherein the warm air streams of the second and fourth phases, are preheated using the heat of condensation picked up by the said second heat storage condenser (2) in the fourth phase and the heat of condensation picked up by said first heat storage condenser (1) in the second phase, respectively, before being additionally heated by solar radiation and being used to expel moisture from the hygroscopic medium.

31 Claims, 5 Drawing Figures

METHOD AND APPARATUS FOR ABSTRACTING WATER FROM AIR

FIELD OF THE INVENTION

This invention relates to a method for abstracting water from air, in which in a first phase of a recurring cycle a stream of cool, humid air from the surrounding atmosphere is used first to cool a heat storage condenser, then to humidify a hygroscopic medium, and in a subsequent second phase of the cycle a stream of warm air reheated by solar radiation is used to expel the moisture from the hygroscopic medium and to carry the expelled moisture into the heat storage condenser where while yielding heat of condensation it condenses to be drained away. This invention also relates to apparatus for implementing said method.

BACKGROUND OF THE INVENTION

A method of the foregoing general type has been disclosed in printed German patent specification DE-A No. 26 60 068. While this known method makes it possible to abstract admittedly large quantities of water from the air that will well be sufficient for large-scale irrigation efforts even while utilizing a difference in elevations to generate hydroelectric energy for self-sufficiency of the system operating on said method, the water yield will still be limited by the fact that the supply of heat required for the expulsion of moisture in every second phase of the process cycle cannot be improved beyond that permitted by the limited amount of solar radiation available.

OBJECTS OF THE INVENTION

Accordingly, it is an object of the present invention to provide an improved process and apparatus for abstracting moisture from air.

An additional object of the invention is to provide a process and apparatus for abstracting moisture from air in which the supply of available heat is not strictly limited by the amount of solar radiation available at the given instant.

Another object of the present invention is to provide a process and apparatus for abstracting moisture from air which conserves the heat of condensation of the condensed moisture and makes use of the conserved heat to preheat an air stream.

A further object of the present invention is to provide a process and apparatus for abstracting moisture from air, the operation of which can readily be adapted to varying weather conditions.

A still further object of the present invention is to provide a process and apparatus for abstracting moisture from air which makes economical use of available solar radiation.

Yet another object of the present invention is to provide a process and apparatus for abstracting moisture from air which can produce a greater yield of water for a given amount of constructional investment cost and operating cost compared to prior art systems.

It is also an object of the present invention to provide a process and apparatus for abstracting moisture from air which can produce sufficient electrical energy to be energy self-sufficient.

SUMMARY OF THE INVENTION

These and other objects of the invention are achieved by providing a method for abstracting water from air comprising a recurring cycle comprising a first phase wherein a stream of cool, humid air from the atmosphere is used first to cool a first heat storage condenser and then to moisten a hygroscopic medium; a second phase wherein a stream of warm air heated by solar radiation is used to expel the moisture from the hygroscopic medium and to carry the expelled moisture into said first heat storage condenser where said moisture condenses and yields its heat of condensation; a third phase wherein a second stream of cool, humid air from the atmosphere is used first to cool a second heat storage condenser and then to remoisten the hygroscopic medium; and a fouth and final phase wherein a second stream of warm air heated by solar radiation is used to expel the moisture from the hygroscopic medium and to carry the expelled moisture into said second heat storage condenser where the moisture condenses and releases its heat of condensation and wherein, depending upon the intensity of the solar radiation, the stream of warm air from said second phase is preheated using the heat of condensation picked up by said second heat storage condenser in said fourth phase, and said second stream of warm air in said fourth phase is preheated using the heat of condensation picked up by said first heat storage condenser in said second phase before said warm air is additionally heated by solar radiation or used to expel moisture from said hygroscopic medium.

The objects of the invention are further achieved by providing apparatus for abstracting moisture from air comprising first and second heat storage condensers disposed in a structure with a transparent roof, adsorber means containing a hygroscopic medium disposed above said first and second condensers, and air handling means and air shut-off means for selectively passing streams of air through at least one of said heat storage condensers and through said adsorber means in a desired sequence and direction.

In particular, the present invention provides an arrangement in which a third phase following the second phase of the cycle another stream of cool, humid air from the surrounding atmosphere is used first to cool a further heat storage condenser, then to rehumidify the hygroscopic medium and in a fourth and last phase of the cycle another stream of warm air which has been additionally heated with solar energy is used to expel the moisture from the hygroscopic medium and to carry the expelled moisture into the other heat storage condenser, where while yielding heat of condensation it condenses to be collected and drained away, and where depending on the intensity of solar radiation, the warm stream of air of the second phase, using the heat of condensation picked up by the other heat storage condenser in the fourth phase, and/or the warm stream of air of the fourth phase using the heat of condensation picked up by the one heat storage condenser in the second phase, is preheated before the moisture is expelled and/or is additionally heated using solar radiation.

The method of the present invention therefore makes it possible, at the same amount of solar radiation, to improve the water yield by a multiple of its original amount by utilizing the heat of condensation stored alternately in the one or the other heat storage condenser to preheat the stream of air destined for the expulsion of moisture, so that utilizing a suitable difference in elevations the water yield will generate much more hydroelectric energy than would be necessary to make the apparatus for said method self-sufficient. The amounts of water obtained by the method of the present invention will also be sufficient for large-scale economical generation of useful energy via the production of biomass. The recovery of condensation heat makes for economical use of solar energy such that the abstraction of water from air has also become economically feasible in countries where solar radiation is not so pronounced as in strictly desert regions, e.g., in the Mediterranean countries.

In a further aspect of the present invention, depending upon the intensity of solar radiation, either partial flows only or the entire amounts of the air streams of the second and fourth phases are circulated in counterflow through the two heat storage condensers and the hygroscopic medium. When partial air flows are circulated, a portion of the respective air flow is released to the environment each time around, and is replaced by admixing a corresponding partial stream of outside air.

This further aspect of the present invention makes the method very flexible, and adaptable to weather conditions. If, for example, the sky is lightly clouded and the outside temperature is not particularly high, a partial stream can be diverted, each time around, from the air stream circulating in the second and fourth phases and replaced with a corresponding partial stream from the environment. If on the other hand the sky is extremely clouded, it will be possible to circulate the entire air streams of the second and fourth phases in isolation from the ambient air, so that moderate solar radiation will still be sufficient to offset heat losses that may result from radiation, convection or thermal conduction. Should the weather so require in the course of the second or fourth phase, conversion can naturally be made from the completely closed-loop circuit to the half-open circuit with ambient air being admixed, or even to a fully open circuit of the air streams or vice versa.

In a preferred aspect of the present invention the respective heat storage condenser is cooled in the first and third phases of the cycle such that the temperatures at its air inlet and outlet ends are at approximately the same low level, while in the second and fourth phases of the cycle the respective heat storage condenser is heated such that a temperature gradient is produced between its air inlet and outlet ends; the upper value of the gradient at the end of condensation being approximately equal to the temperature of the warm air stream at the air outlet end of the hygroscopic medium, said air stream being humidified in the hygroscopic medium, and the lower value of the gradient at the end of condensation being still approximately equal to the temperature prevailing at the end of the cooling process at the air outlet end of the respective heat storage condenser, and that the temperature gradient produced in the respective heat storage condenser is preserved until the second or fourth phase of the subsequent cycle for preheating the air stream going to the hygroscopic medium for the purpose of expelling moisture.

In a process according to the invention, the optimum operating temperatures are as follows. Depending on the intensity of solar radiation, the temperature of the respective heat storage condenser after cooling in the first or third phase will be in the approximate range of 0° C. to 30° C., and the upper and lower values of the temperature gradient produced in the respective heat storage condenser by absorption of condensation heat will run in the approximate range of 50° C. to 70° C. Additional heating of the preheated air stream by solar radiation in the second and fourth phases will give a temperature in the approximate range of 60° C. to 90° C.

It is possible to commence the process immediately with the cooling of the one heat storage condenser, while the other heat storage condenser does not have the temperature distribution needed to preheat the second and fourth phase air streams for the purpose of expelling moisture. It will nevertheless be helpful, when prior to initial start of the cycle or after an extended interruption between two phases, the respective heat storage condenser used for preheating the air stream in the second and fourth phases, respectively, is preheated with air from the ambient atmosphere until its temperature distribution is approximately equal to the temperature gradient that is subsequently produced at the time of condensation.

The apparatus for implementing the method is provided with a heat storage condenser arranged in a housing with a transparent roof. Above the condenser is an adsorber accommodating the hygroscopic medium. The apparatus is characterized in that in addition to the one heat storage condenser, another heat storage condenser of equal or at least approximately equal size is provided, in that the adsorber extends over both heat storage condensers and in that air handling means, such as fans, and air shut-off means, such as flap or slide valves, are used to adjust the air requirements in each phase of the process cycle. The housing is thermally insulated from the outside and the heat storage condensers are thermally insulated one from the other to prevent thermal losses to the outside and heat transfer between the heat storage condensers which alternately absorb condensation heat.

Above the heat storage condensers, a slide valve covering the upper cross-sectional area of one heat storage condenser is provided together with means for shifting it from one heat storage condenser to the other. This slide valve serves, on the one hand, for routing the air as required, and on the other hand it covers the top of that heat storage condenser through which air does not flow in the first and third phases of the process cycle, protecting it from heat losses. The place of this slide valve can be taken also by a flap mechanism covering both heat storage condensers and having provisions for alternately moving the flaps over the one heat storage condenser and the flaps over the other heat storage condenser to open and closed positions, respectively.

In order to be able to readily raise the air temperature in the second and fourth phases of the process cycle to 80° C. or 90° C. before it enters the adsorber, the adsorber is preferably formed as a flat solar collector with a hygroscopic medium that is dyed black and with a heat conducting and absorbing vessel for the hygroscopic medium. The transparent roof of the housing is preferably made of natural glass, polyacrylic or polyester material. The roof can comprise a plurality of transparent plates spaced at a distance one over the other, with an insulating layer of air intervening between them.

As a hygroscopic medium, use is preferably made of a silica gel having an adsorption temperature in the 0° C. to 30° C. range and a desorption temperature in the 70° C. to 90° C. range. A gel of this type gives a water expulsion from the gel of 80 to 95%, and a water absorption of 30 to 65% of its own weight.

As a material for the heat storage condenser, use is preferably made of rock, concrete or similar slabs spaced side by side in preferably vertical arrangement, allowing air passages from 4 to 10 mm wide to remain between the slabs which are 1.50 to 2.50 m long and 40 to 120 mm thick. Because of the poor thermal conductivity of the slabs, the temperature distribution from top to bottom prevailing at the time of condensation will be from 70° C. to 10° C. This makes it possible for them to yield heat to the air in the desorption phases while still operating in their cold region as condensers to abstract water.

In order to economize energy in the air routing arrangement, diffusors can be formed between the upper ends of adjacent slabs by chamfering their upper edges.

Heat storage and recovery as it is practiced with the slab-type heat storage condenser can be achieved, when using water or latent heat storage condensers, by incorporating horizontal thermal insulating layers in the heat storage condensers in stratiform arrangement.

To keep the apparatus clean, a layer of a filter material such as stratified pebbles, can be arranged over the heat storage condensers. This layer will clean itself in the desorption phases as a result of the water carried in the air and simultaneously serves as thermal insulation for the heat storage condensers.

BRIEF DESCRIPTION OF THE DRAWINGS

The invention will be further explained with reference to the accompanying drawings wherein.

DETAILED DESCRIPTION OF A PREFERRED EMBODIMENT

Figure 1:
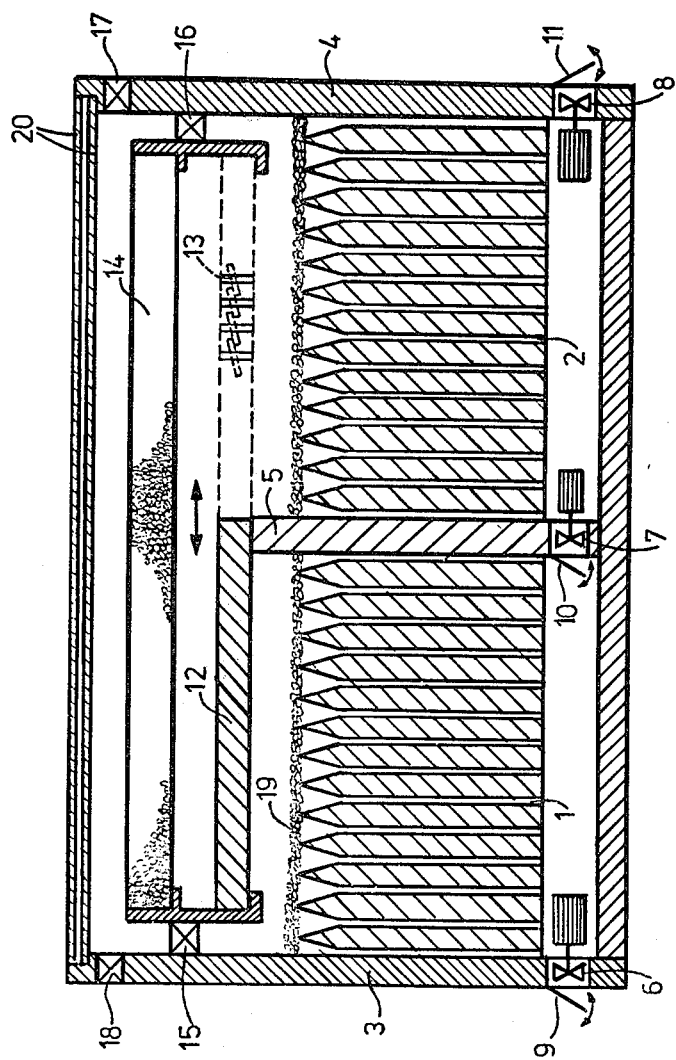
FIG. 1 illustrates an embodiment of the new apparatus for implementing the method in simplified schematic arrangement.

The heat storage condensers 1, 2 are arranged at a distance above the floor of a housing or structure having the outer walls 3, 4. Arranged in the outer walls 3, 4 and a partition 5 are fans 6, 7, 8 with associated flaps 9, 10, 11 for air handling. Disposed above the heat storage condensers 1, 2 is a slide valve 12, which depending on the phase of process cycle is moved into position over the one or the other heat storage condenser by means of conventional hydraulic or electric actuating means, not shown on the drawing. Alternatively, instead of the slide valve 12, use could also be made of a flap mechanism 13 extending over both heat storage condensers 1 and 2, with the flaps over the one and the other heat storage condenser being alternately moveable into an open or closed position, depending on the phase of the process cycle. Arranged at a distance above the slide valve 12 is an adsorber 14 consisting of an aluminum vessel which contains silica gel as a hygroscopic medium, the gel being dyed black. The structure is covered by two spaced-apart transparent natural glass, polyacrylic or polyester sheets 20. Valves 15 to 18 are provided in the upper area of the structure for air handling. Each heat storage condenser 1 or 2 consists of a plurality of vertically positioned stone slabs which are spaced apart to form air passages and are feathered at their upper ends such that each two adjacent slabs will form a diffusor at their upper ends. A filter material such as pebbles layer 19 is deposited on the tips of the slabs of heat storage condensers 1 and 2.

Figure 2:
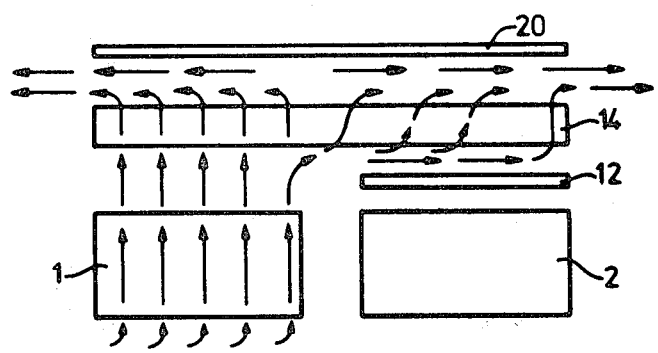
FIGS. 2 to 5 are simplified schematic representations of the air route during the various phases of the process cycle.

The apparatus operates as follows. After the air has been circulated for perhaps several days by the fan 8 through the heat storage condenser 2 with the slide valve 12 positioned over the heat storage condenser 1, and with the valves 11, 16 and 17 open to preheat heat storage condenser 2, the process begins with its first phase where cool, humid outside air is forced by the fan 6, with the slide valve 12 moved to the right-hand side and the valves 7, 11 and 16 closed, through the heat storage condenser 1 and through the adsorber 14, which picks up water, and then to the open air through valves 17 and 18. This first phase is illustrated in FIG. 2. Phase one preferably takes place at night for a duration of up to about 10 hours.

In the second phase of the process cycle, which preferably takes place during the day, the air is circulated through the two heat storage condensers 1 and 2 and the adsorber 14 depending on the weather in a closed-loop circuit, in a semi-open circuit with outside air being admixed, or in a completely open circuit, whereby in every case valve 12 is positioned over the heat storage condenser 2.

Figure 3:
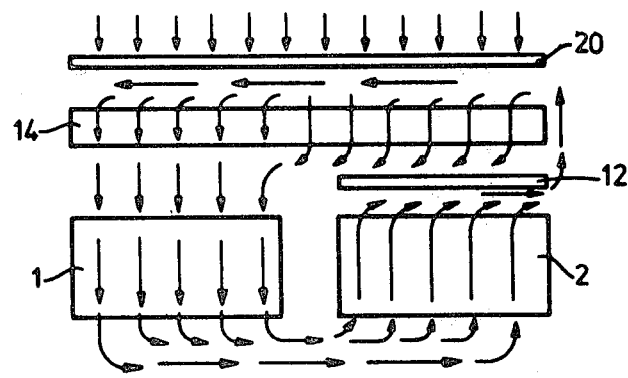

In the closed-loop circuit, illustrated in FIG. 3, with the valves 10, 15 and 16 open, the air is circulated by fan 7 upwards through the heat storage condenser 2, passes adjacent sheets 20 then downward through the adsorber 14, and finally downwards through the heat storage condenser 1. The circulating air stream is preheated in the heat storage condenser 2, then additionally heated by the sun's rays entering the structure, humidified in the adsorber and cooled in the heat storage condenser 1 for condensation of the moisture. The water which condenses in the heat storage condenser 1 runs to the bottom where it is collected and drained away.

In the semi-open circuit, a portion of the circulating air stream is diverted into the open air, with the fan 6 operating and the valve 9 being open. The discharged portion of the circulating air stream is replaced by a corresponding partial air stream through the open valve 11 under pressure from fan 8.

In the open circuit, outside air enters the structure through the open flap 11 under pressure from the fan 8, flows upwardly through the heat storage condenser 2, then downwardly through the adsorber 14 and through the heat storage condenser 1 and finally into the open air through the open flap 9 under pressure from fan 6.

Figure 4:
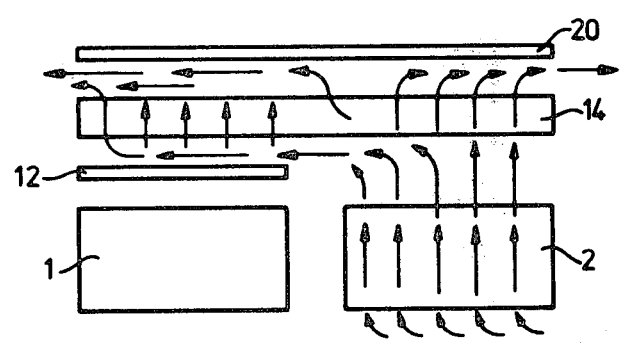

In the third phase of the process cycle, shown in FIG. 4, valve 12 is positioned over heat storage condenser 1, and cool, moist air enters the structure through an open valve 11, the valves 9 and 10 being closed, after which the air flows upwardly through the heat storage condenser 2, then upwardly through the adsorber 14 before it escapes from the structure through the open valves 17 and 18. Like the first phase, the third phase preferably takes place at night.

Figure 5:
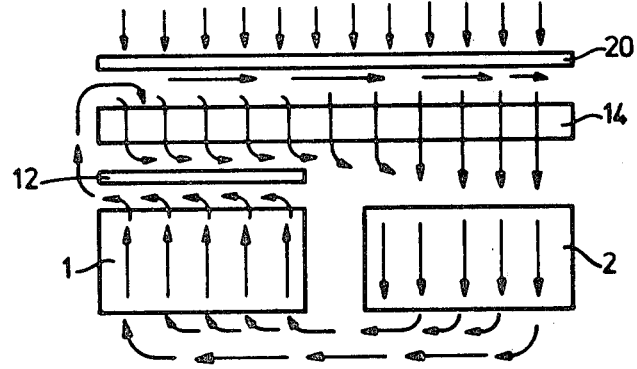

In the subsequent fourth and last phase depicted in FIG. 5, the air is transported as in the second phase, except that directions are now reversed, with the valve 12 positioned over the heat storage condenser 1. The water now condenses in the heat storage condenser 2, and the circulating air is preheated in the heat storage condenser 1.

Thefollowing figures and technical particulars are additionally of interest relative to the water abstraction apparatus described above.

The slabs are 1.50 to 2.50 m high and 80 to 120 mm thick, with a distance of 4 to 10 mm between slabs for passageways. The thermal conductivity of the slabs is 0.8 to 1.6. If use is made of water or latent heat storage units, insulating layers are provided in the storage units, spaced some 50 to 150 mm apart to prevent the transfer of heat vertically. For reasons of weight the latter type of storage units would be preferred for mobile apparatus. The diffusors exhibit an angle of 15°. Compared with the known water abstraction system described in the Background of the Invention section, the apparatus of the present invention will save 80 to 90% of the solar energy, which means a safe yield of 4 to 80 liters of water per square meter of adsorber area over 24 hours. A 400 meter difference in elevation would be sufficient to generate enough electrical energy to make the apparatus self-sufficient. The mass of the slabs should be about 5,200 kg, which would store 40,000 to 60,000 kcal. Depending on climate and temperature conditions, the volume of the desorption air will be 80 to 200 cubic meters per 1 m$^2$; and the water vapor/air mixture flowing into the heat storage condenser should have a velocity of 0.4 to 2 meters per second. Depending on nighttime temperatures and relative humidity, the adsorption air has a volume of 600 to 1500 cubic meters per square meter per hour. The energy expended will be 1 to 1.5 kilowatt hours per cubic meter of water, depending on conditions.

The foregoing embodiments have been set forth only as preferred illustrative examples of the invention and are not intended to be limiting. Since modifications of the disclosed embodiments within the scope and spirit of the invention may occur to persons skilled in the art, the scope of the invention is to be limited solely by the scope of the appended claims.

I claim:
1. A method of abstracting water from air using first and second heat storage condensers operated in conjunction with a single adsorber containing hygroscopic medium, said method comprising a recurring cycle comprising
   a first phase wherein a stream of cool, humid air from the atmosphere is used first to cool the first heat storage condenser and then to moisten the hygroscopic medium;
   a second phase wherein a stream of warm air heated by solar radiation is used to expel the moisture from the hygroscopic medium and to carry the expelled moisture into said first heat storage condenser where said moisture condenses and releases its heat of condensation;
   a third phase wherein a second stream of cool, humid air from the atmosphere is used first to cool the second heat storage condenser and then to remoisten the hygroscopic medium; and
   a fourth and final phase wherein a second stream of warm air heated by solar radiation is used to expel the moisture from the hygroscopic medium and to carry the expelled moisture into said second heat storage concenser where the moisture condenses and releases its heat of condensation; and
   wherein the stream of warm air from said second phase is preheated using the heat of condensation picked up by said second heat storage condenser in said fourth phase, and the stream of warm air in said fourth phase is preheated using the heat of condensation picked up by said first heat storage condenser in said second phase before said warm air is additionally heated by solar radiation or used to expel moisture from said hygroscopic medium.

2. A method according to claim 1, wherein depending on the intensity of the solar radiation, at least part of the air streams from the second and fourth phases are circulated in opposite directions through said first and second heat storage condensers and the hygroscopic medium, and wherein when less than all of said air streams are circulated, the non-circulated portion of the respective air stream is discharged each time around to the surrounding atmosphere and is replaced by introducing into and admixing with said circulated portion a stream of air from the surrounding atmosphere.

3. A method according to claim 1 or claim 2, wherein the respective heat storage condensers cooled during the first and third phases of said recurring cycle are cooled until the temperatures prevailing at the inlet end and at the outlet end of each said condenser are approximately the same, and wherein the respective heat storage condensers heated during the second and fourth phases of the recurring cycle by the absorption of the heat of condensation are heated such that a temperature gradient is produced between the air inlet end and the air outlet end of each of the heated condensers; the upper value of said temperature gradient at the end of the condensation being approximately equal to the temperature of the warm stream of air leaving the hygroscopic medium after having picked up moisture from the hygroscopic medium; the lower value of said temperature gradient at the end of the condensation being approximately equal to the temperature prevailing at the air outlet of said heated condenser at the end of cooling.

4. A method according to claim 3, wherein the temperature gradient produced in the heated condenser during the second and fourth phases is preserved until the corresponding phase of the next subsequent cycle and used for preheating the stream of air used to expel moisture from the hygroscopic medium.

5. A method according to claim 3, wherein, depending on the intensity of the solar radiation, the temperature of the respective heat storage condensers cooled in the first and third phases of the cycle lies in the range from about 0° C. to about 30° C.; the upper and lower values of the temperature gradient produced in the respective heat storage condensers heated by the absorption of condensation heat during the second and fourth phases of the cycle lies in the range from about 50° C. to about 70° C., and the temperature of the warm air stream after heating by solar radiation in the second and fourth phases lies in the range from about 60° C. to about 90° C.

6. A method according to claim 3, wherein prior to the initial start of the cycle or following an extended interruption between two phases, the respective heat storage condenser used to preheat the stream of air in the second or fourth phase of the cycle, is itself preheated with a stream of warm air from the surrounding atmosphere until its temperature distribution approximates the temperature gradient produced by absorption of the heat of condensation when moisture is subsequently condensed in said condenser.

7. A method according to claim 1, further comprising collecting the water which condenses in said first and second heat storage condensers and using the collected water to hydroelectrically generate electric power for driving means for producing and directing the flow of the air streams used in the method.

8. A method according to claim 1, wherein said hygroscopic medium comprises silica gel having an absorption temperature in the range from about 0° C. to about 30° C. and a desorbtion temperature in the range from about 70° C. to about 90° C.

9. A method according to claim 1, wherein the air streams passing through said heat storage condensers are filtered as they exit the condensers.

10. A method according to claim 1, wherein the stream of warm air from said second or said fourth phase of said cycle is discharged to the surrounding atmosphere after the moisture has been condensed therefrom in one of said heat storage condensers, and fresh air from the surrounding atmosphere is introduced into the other of said heat storage condensers.

11. A method according to claim 1, wherein the stream of warm air from said second or said fourth phase of said cycle following condensation of moisture therefrom in one of said heat storage condensers is introduced into the other of said heat storage condensers.

12. A method according to claim 1, wherein following condensation of moisture from the stream of warm air in one of said heat storage condensers in said second or said fourth phase of said cycle, a portion of the warm air stream is discharged to the surrounding atmosphere and the remainder of said warm air stream is introduced into the other of said heat storage condensers along with a portion of fresh air from the surrounding atmosphere.

13. A method according to claim 1, wherein said first and second heat storage condensers are substantially equal in size.

14. Apparatus for abstracting water from air comprising first and second heat storage condensers disposed in a structure with a transparent roof, a single adsorber means containing a hygroscopic medium disposed above said first and second heat storage condensers, and air handling means and air shut-off means for selectively passing streams of air through at least one of said heat storage condensers and through said adsorber means in a desired sequence and direction; said air handling means comprising first selectively operable fan means for passing a stream of air over said first heat storage condenser, second selectively operable fan means for passing a stream of air over said second heat storage condenser and third selectively operable fan means for passing a stream of air from one of said first and second heat storage condensers to the other of said first and second heat storage condensers and vice versa.

15. Apparatus according to claim 14, wherein said first and second heat storage condensers are substantially equal in size.

16. Apparatus according to claim 14, wherein said air shut-off means comprises a slide valve for selectively shutting air off the flow of air from said adsorber means to one or the other of said first and second heat storage condensers.

17. Apparatus according to claim 16, wherein said slide valve covers the upper cross-sectional area of a heat storage condenser and means are provided for shifting said slide valve from a position above one heat storage condenser to a position above the other heat storage condenser.

18. Apparatus according to claim 14, wherein said air shut-off means comprises at least one gate valve communicating between the interior of said housing above said adsorber means and the outside atmosphere.

19. Apparatus according to claim 14, wherein said air shut-off means comprises a first gate valve communicating between said first heat storage condenser and a space in said housing above said adsorber means and a second gate valve communicating between said second heat storage condenser and said space in said housing above said adsorber means.

20. Apparatus according to claim 14, wherein said housing is thermally insulated with respect to the surrounding environment.

21. Apparatus according to claim 14, wherein said first and second heat storage condensers are thermally insulated from each other.

22. Apparatus according to claim 14, wherein said air shut-off means comprises a first flap valve means covering the upper cross-sectional area of said first heat storage condenser, a second flap valve means covering the upper cross-sectional area of said second heat storage condenser and means for selectively opening one of said first and second flap valve means.

23. Apparatus according to claim 14, wherein said adsorber means comprises a flat solar collector comprising a thermally conductive and absorbent vessel containing a hygroscopic medium.

24. Apparatus according to claim 23, wherein said hygroscopic medium is dyed black.

25. Apparatus according to claim 23, wherein said hygroscopic medium comprises silica gel having an absorption temperature in the range from about 0° C. to about 30° C. and a desorption temperature in the range from about 70° C. to about 90° C.

26. Apparatus according to claim 14, wherein said heat storage condensers comprise slabs of material selected from the group consisting of rock and concrete disposed at spaced intervals in side by side relation to each other.

27. Apparatus according to claim 26, wherein said slabs are vertically oriented.

28. Apparatus according to claim 26, wherein a diffuser is formed at the outlet end of each heat storage condenser by chamfering the edges of said slabs at the outlet ends thereof.

29. Apparatus according to claim 14, wherein said heat storage condensers comprise water or latent heat reservoirs provided with transverse layers of thermal insulating material.

30. Apparatus according to claim 14, further comprising a layer of filter material arranged above each heat storage condenser.

31. Apparatus according to claim 30, wherein said layer of filter material comprises a stratum of pebbles.

* * * * *